United States Patent
Kobayashi et al.

(10) Patent No.: US 7,744,711 B2
(45) Date of Patent: *Jun. 29, 2010

(54) MANUFACTURING METHOD OF CERAMIC SLURRY, GREEN SHEET AND MULTILAYER CERAMIC DEVICE

(75) Inventors: Hisashi Kobayashi, Tokyo (JP); Shigeki Satou, Tokyo (JP)

(73) Assignee: TDK Corporation, Tokyo (JP)

( * ) Notice: Subject to any disclaimer, the term of this patent is extended or adjusted under 35 U.S.C. 154(b) by 1146 days.

This patent is subject to a terminal disclaimer.

(21) Appl. No.: 10/571,542

(22) PCT Filed: Aug. 31, 2004

(86) PCT No.: PCT/JP2004/012555

§ 371 (c)(1),
(2), (4) Date: Mar. 10, 2006

(87) PCT Pub. No.: WO2005/026077

PCT Pub. Date: Mar. 24, 2005

(65) Prior Publication Data

US 2006/0280933 A1   Dec. 14, 2006

(30) Foreign Application Priority Data

Sep. 12, 2003 (JP) ............................. 2003-320952

(51) Int. Cl.
*C03B 29/00* (2006.01)

(52) U.S. Cl. .................... 156/89.12; 524/401; 524/413; 524/430; 524/431; 524/432; 524/433; 524/436

(58) Field of Classification Search .................. 524/436, 524/430, 431, 432, 433, 413, 401; 156/89.12
See application file for complete search history.

(56) References Cited

U.S. PATENT DOCUMENTS 6,579,394 B1 * 6/2003 Nakamura et al. ....... 156/89.12
7,396,425 B2 * 7/2008 Ishiyama et al. .......... 156/89.12
2001/0002606 A1 * 6/2001 Nakamura et al. ....... 156/89.11

FOREIGN PATENT DOCUMENTS

| DE | 100 35 987 A1 | 3/2001 |
| GB | 2 355 947 A | 5/2001 |
| GB | 2 363 086 A | 12/2001 |
| GB | 2 363 087 A | 12/2001 |
| GB | 2 363 088 A | 12/2001 |
| JP | A-11-099514 | 4/1999 |
| JP | A-2001-106578 | 4/2001 |
| JP | A-2001-163675 | 6/2001 |
| JP | B2-3304927 | 5/2002 |
| JP | B2-3387455 | 1/2003 |
| JP | A-2003-146764 | 5/2003 |
| JP | B2-3538706 | 4/2004 |

* cited by examiner

*Primary Examiner*—Peter D Mulcahy
(74) *Attorney, Agent, or Firm*—Oliff & Berridge, PLC

(57) ABSTRACT

A manufacturing method of ceramic slurry being used for producing a green sheet which can have a smooth surface, exhibits a satisfactory sheet strength, and is excellent in workability such as releasing, a green sheet produced by the use of the slurry produced by the method, and a multilayer ceramic device produced by the use of the green sheet is provided. According to the present invention, a manufacturing method of ceramic slurry at least comprising a ceramic powder and a binder resin solution, wherein a high-pressure dispersing treatment of the ceramic powder and a lacquer for preliminary addition, which is a part of the binder resin solution, is carried out so that a shearing rate is set to $1\times10^7$ to $1\times10^8$ [1/sec] to prepare a preliminary slurry, and at least a lacquer for post-addition, which a high-pressure dispersing treatment is not applied, is added to the preliminary slurry which a high-pressure dispersing treatment is applied.

18 Claims, 2 Drawing Sheets

(PASTE FOR GREEN SHEET/CERAMIC SLURRY)

MANUFACTURING METHOD OF CERAMIC SLURRY, GREEN SHEET AND MULTILAYER CERAMIC DEVICE

BACKGROUND OF THE INVENTION

1. Field of the Invention

The present invention relates to a manufacturing method of ceramic slurry, more particularly, a manufacturing method of ceramic slurry being used for producing a green sheet which can have a smooth surface, exhibits a satisfactory sheet strength, and is excellent in workability such as releasing, a green sheet produced by the use of a slurry produced by the method, and a multilayer ceramic device produced by the use of the green sheet.

2. Description of the Related Art

Developments of ceramic green sheet are performed to obtain a high-capacitance multilayer ceramic chip capacitor as an example of multilayer ceramic device. The multilayer ceramic chip capacitor has a structure of alternately laminating electrode layers, which one end is exposed to the edge of the chip, and dielectric layers, and both sides of the laminating direction are covered with the dielectric layers like a lid.

While more dielectric layers in 1 chip can provide a higher capacity, the chip size is fixed. Therefore, in order to make capacitance of the chip large or maintain the capacitance while miniaturizing the chip, the dielectric layer is required to be thin. The dielectric layer is obtained by covering dielectric particles having a diameter of sub micron order with resin, i.e. binder, to form a sheet, laminating these sheets, and firing. Therefore, in order to laminate said dielectric layers, it becomes important to produce a thin green sheet.

However, when the sheet becomes thin, unevenness on the sheet surface cannot be ignored. That is, when the sheet is thin, a surface state change, which was not needed to take into consideration when the sheet was thick, turns into change of the sheet thickness itself. It is expected that concaves of the unevenness on the surface becomes weak to voltage impression after firing, and causes short circuit. Therefore, it is indispensable requirements for manufacturing multilayer chip capacitor to provide a sheet having a smooth surface, i.e. small change of a surface roughness, and a uniform thickness.

As factors, which influence the surface unevenness of a sheet, a particle size of pigments, a paste composition, a dispersing condition when manufacturing the paste, a spreading condition when forming a sheet, and a smoothing treatment to the sheet itself, etc. are mentioned. The present invention relates to an improvement approach of the distributed condition when manufacturing the paste. Pigments not causing aggregation within the paste and disperse as a single particle form raises surface characteristic and density of the sheet formed with said pigments. With the present invention, pigments can be dispersed, and sheet having superior surface characteristic can be manufactured.

In addition, as shown in the following patent reference 1, a method to improve dispersiveness by performing a high-pressure treatment particularly to the binder while manufacturing the paste is proposed. However, with the technique shown in this patent reference 1, since a high-pressure dispersion treatment is applied to the paste including binder. i.e. resin, as shown in FIG. 2(B), shearing stress is given to not only pigments but also resin. For this reason, the resin will be destroyed by the shearing stress, and deterioration in sheet strength may be caused.

Patent Reference 1: U.S. Pat. No. 3,387,455

SUMMARY OF THE INVENTION

An Object to Solve the Invention

In view of the above circumstance, an object of the present invention is to provide a manufacturing method of ceramic slurry being used for producing a green sheet having a smooth surface, exhibits a satisfactory sheet strength, and is excellent in workability such as releasing, a green sheet produced by the use of a slurry manufactured by the method, and a multilayer ceramic device manufactured by the use of the green sheet.

Means to Solve the Invention

In order to solve the above-mentioned object, the manufacturing method of ceramic slurry according to the invention is a manufacturing method of ceramic slurry according to the invention at least comprising ceramic powder and binder resin solution, wherein a high-pressure dispersing treatment of said ceramic powder and said lacquer for preliminary addition, which is a part of said binder resin solution, is carried out so that a shearing rate may be set to $1 \times 10^7$ to $1 \times 10^8$ [1/sec], and a preliminary slurry is prepared, and at least said lacquer for post-addition, which a high-pressure dispersing treatment is not applied is added to the preliminary slurry which a high-pressure dispersing treatment is applied.

By applying a high-pressure dispersing treatment to the slurry, shearing stress is added to the aggregated powders within the slurry. This stress loosens the aggregation and pigments (ceramic powders) may be dispersed to one powdery unit. Since this stress is applied by using only slurry, and no media such as beads is used, contamination does not occur.

Moreover, if resin is mixed in slurry, the shearing force by the pressure is also applied to resin, and the structure of said resin will be destroyed and molecular weight of the same will be decreased. This may cause deterioration in formed sheet strength and a trouble that the detachability and the conveyance of the sheet get worse. Particularly, it becomes a problem when a thickness of the green sheet is 5 µm or less, particularly 3 µm or less. To the contrary, in the present invention, the resin is added in the paste after performing the high-pressure treatment so that the shearing stress is not applied to the resin and the sheet strength is prevented from deterioration even when the sheet is made thinner.

Furthermore, temperature of the paste generally rises when a high pressure dispersing treatment is applied. Therefore, if said high pressure dispersing treatment is excessively applied to a paste containing an organic solvent, risk such as explosion, will arise. To the contrary, since there is only a small amount of resin and lacquer dissolving the resin, in the treating slurry of the present invention, the pigment ratio as in the treating slurry becomes high, a specific heat of said slurry becomes high, and a temperature rise is suppressed. Therefore, treating the slurry of the present invention is more secure compared to treating the slurry containing whole lacquer. Further, higher pressure treatment can be applied to said slurry of the invention compared to the slurry containing whole lacquer, and a smoother sheet can be obtained by the slurry of the invention.

In this way, a green sheet having a smooth front surface, a good dispersion of pigments, wherein strength of the sheet does not deteriorate can be obtained. Further, surface roughness of the sheet becomes very small with respect to the thickness between layers, therefore, said thickness between layers can be made small and the layers can be made thinner. With the invention, more numbers of layers can be laminated as in multilayer ceramic devices such as a multilayer ceramic capacitor, and said devices can be more small-sized.

Preferably, an amount of the binder resin contained in the above-mentioned lacquer for preliminary addition is less than 20 wt %, preferably less than 10 wt %, and 1 wt % or more, preferably, 4 wt % or more with respect to the whole amount of the resin contained in the ceramic slurry finally obtained.

When an amount of binder resin contained in the lacquer for preliminary addition is excessively large, there will be little effect of the invention mentioned above, and when too small, the stability of the distribution deteriorates causing inclination for a smoothness on the front surface of the sheet to decline.

In the present invention, preferably, a binder resin of the binder resin solution is polyvinyl butyral resin or polyvinyl acetal resin. And degree of polymerization as in said resin is preferably at least 1000 and at most 2600, more preferably, at least 1400 and at most 2600.

In the present invention, when applying a high pressure dispersing treatment, shearing stress is applied to the preliminary slurry so that the shearing rate is set to $1 \times 10^7$ to $1 \times 10^8$ [1/sec], preferably, $2 \times 10^7$ to $1 \times 10^8$ [1/sec], more preferably, $3 \times 10^7$ to $1 \times 10^8$ [1/sec].

In the invention, a method for impressing a high pressure to the-preliminary slurry is not particularly limited, however, a method to pour a paste from a nozzle having a small diameter at high speed, a method of narrowing the path which a paste is poured, are exemplified.

Particularly, when applying a high-pressure treatment using an equipment which applies shearing stress to the preliminary slurry by pouring the slurry into a nozzle having a narrow diameter and impressing with a high pressure, it is desirable that the shearing rate applied to the slurry impressed by the high-pressure is within the above-mentioned range.

When the shearing rate is too small, dispersion inclines to be insufficient, when too large, slurry viscosity tends to become excessively low causing an inclination not able to easily form a thin-layer sheet having a constant thickness by a method of applying.

In the invention, a particle size of the ceramic powder is preferably 0.01 μm to 0.5 μm. Further, in the invention, some of dispersants and/or plasticizers may be added to the preliminary slurry before applying the high pressure dispersing treatment, and some of dispersants and/or plasticizers may be added to the preliminary slurry after applying the high pressure dispersing treatment.

Green sheet as in the present invention is manufactured by using ceramic slurry obtained by any one of the manufacturing methods mentioned above. Multilayer ceramic device as in the invention is manufactured by using the green sheet mentioned above.

BEST MODE FOR CARRYING OUT THE INVENTION

Figure 1:
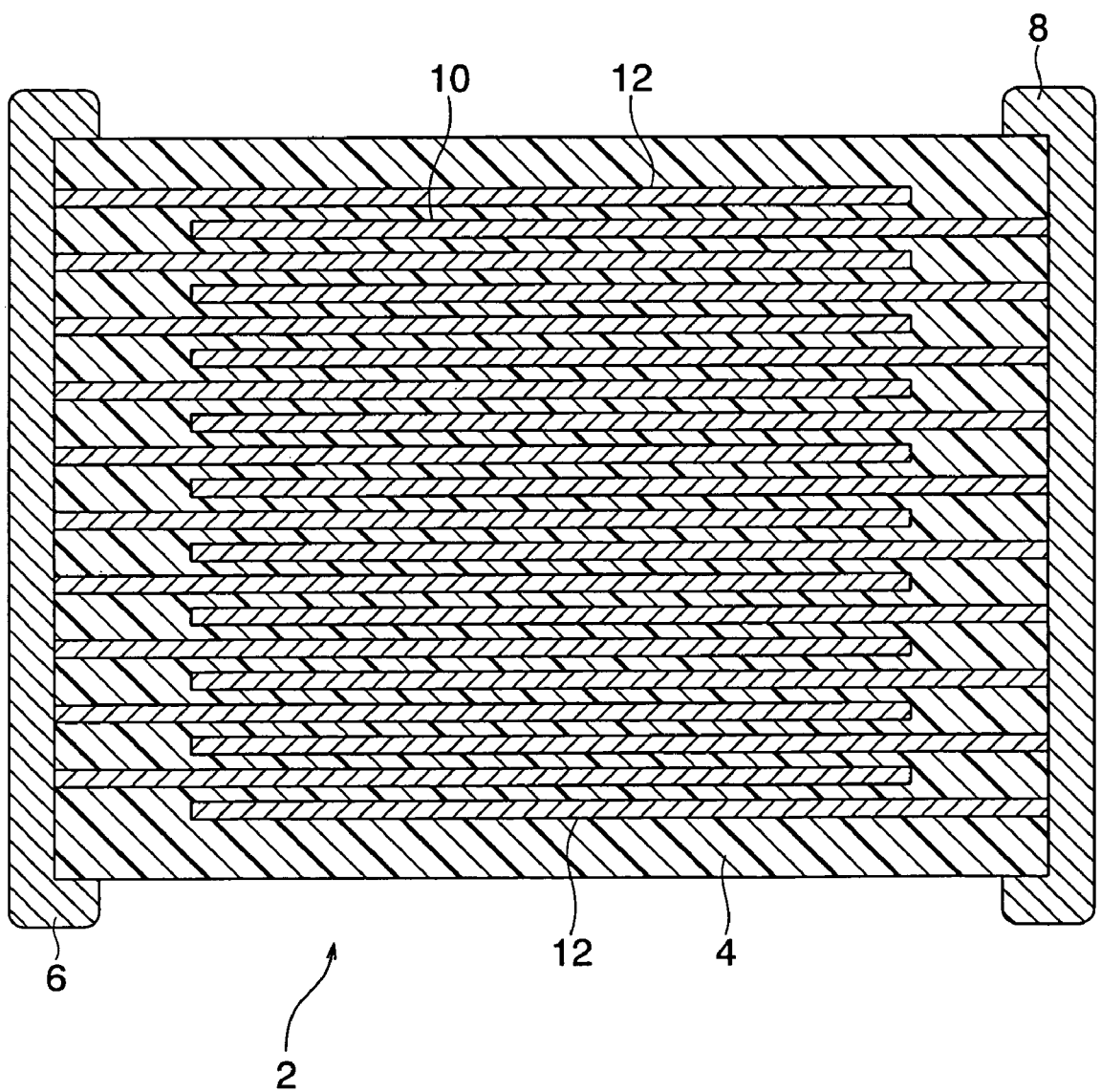
FIG. 1 is a sectional view of a multilayer ceramic capacitor according to an embodiment of the present invention.

Hereafter, the invention is described based on the embodiments shown in the drawings of the invention.

The whole composition of multilayer ceramic capacitor is described as an embodiment of multilayer ceramic device manufactured by the ceramic slurry and the green sheet according to the invention.

As shown in FIG. 1, a multilayer ceramic capacitor 2 according to an embodiment of the present invention comprises capacitor element body 4, the first external electrode 6, and the second external electrode 8. The capacitor element body 4 comprises dielectric layers 10 and internal electrode layers 12, wherein dielectric layers 10 and internal electrode layers 12 are alternately laminated. One side of the alternately laminated internal electrode layers 12 are electrically connected to inside of the first external electrode 6 which is formed at one end portion of the capacitor element body 4. Further, the other side of the alternately laminated internal electrode layers 12 are electrically connected to inside of the second external terminal electrode 8 which is formed at the other end portion of the capacitor element body 4.

Material of the dielectric layer 10 is not particularly limited, and comprises dielectric materials such as barium calcium, strontium titanate and/or barium titanate. The thickness of each dielectric layer 10 is not particularly limited, but generally it is several μm to several hundreds of μm. Particularly in the present embodiment, it is preferably made thinner to 5 μm or less, more preferably, 3 μm or less.

Material of the terminal electrodes 6 and 8 are not particularly limited, but normally, copper, copper alloys, nickel, nickel alloys, etc. is used. Further, silver and an alloy of silver and palladium can also be used. The thickness of terminal electrodes 6 and 8 are also not particularly limited, but normally around 10 to 50 μm.

Configuration and size of the multilayer ceramic capacitor 2 can suitably be determined by its purpose of use. When the multilayer ceramic capacitor 2 is a rectangular parallelepiped configuration, its extent is generally the following: length of 0.6 to 5.6 mm, preferably, 0.6 to 3.2 mm×width of 0.3 to 5.0 mm, preferably, 0.3 to 1.6 mm×a thickness of 0.1 to 1.9 mm, preferably, 0.3 to 1.6 mm.

Next, an example of manufacturing method of multilayer ceramic capacitor 2 according to an embodiment of the invention is explained below.

First, in order to manufacture ceramic green sheet which will compose dielectric layer 10 shown in FIG. 1 after firing, a paste for green sheet, (ceramic slurry) is prepared.

Figure 2A:
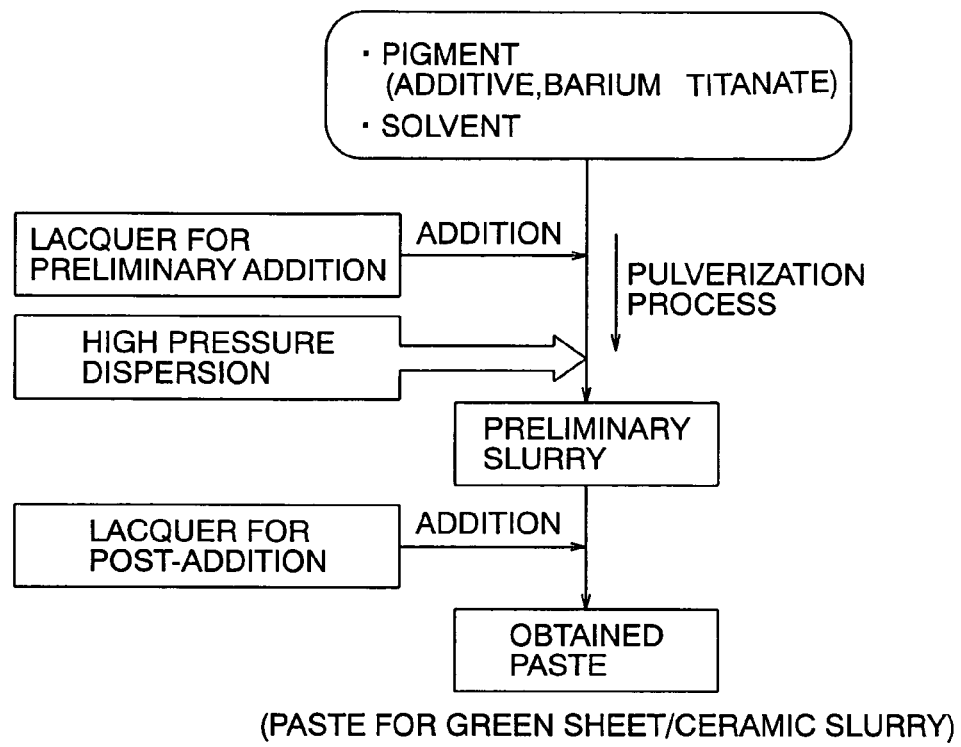
FIG. 2A is a flow chart showing a manufacturing method of ceramic slurry according to an embodiment of the present invention.
Figure 2B:
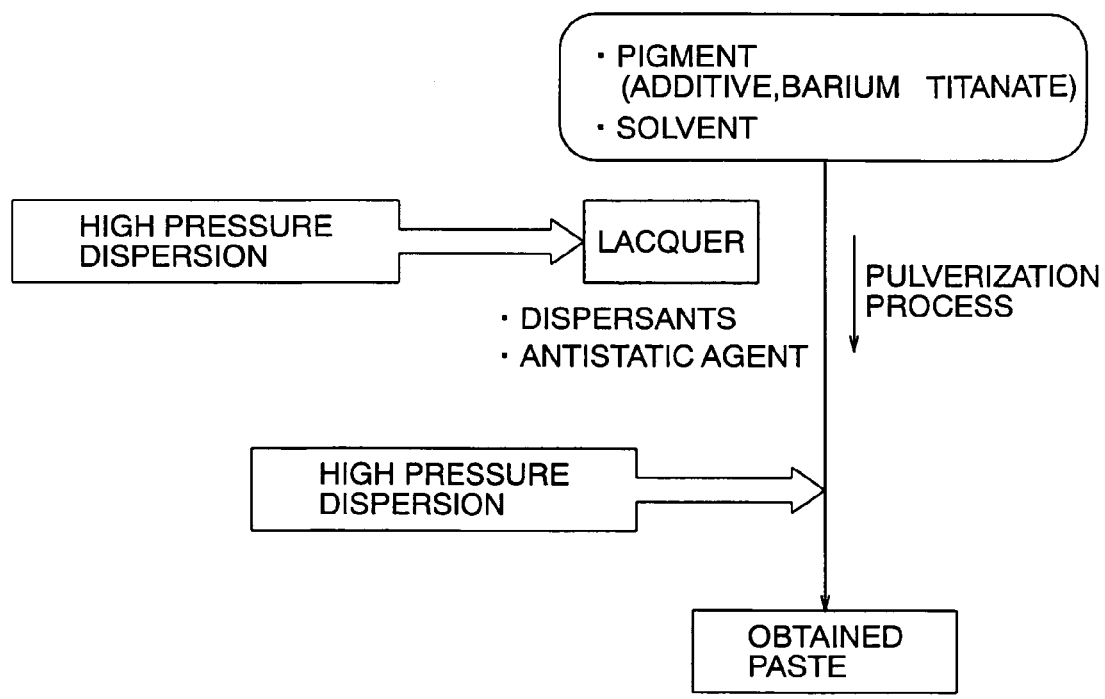
FIG. 2B is a flow chart showing a manufacturing method of ceramic slurry according to conventional method.

In the present embodiment, ceramic slurry as a paste for green sheet is manufactured by a flow chart shown in FIG. 2(A). First, a pigment (ceramic powder) is prepared.

The pigment comprises a main component powder (dielectric particles) such as calcium titanate, strontium titanate and/or barium titanate, which become a main component of the green sheet, and additional particles (additional powder) added with said dielectric particles.

Particle size of the main component powder is generally larger than that of the additional powder, and is around 0.01 or more and 0.5 μm or less, preferably 0.4 μm or less. In addition, in order to form an extremely thin green sheet, it is desirable to use particles finer than the thickness of the green sheet.

The additional powder includes at least one from alkaline-earth metal, transition metal, rare-earth element or glass composition. Said alkaline-earth metal, transition metal, rare-earth element are used not only in the state of single element powder, but those oxides, composite oxides, and the various compounds to be the oxides, such as carbonate, nitrate, hydroxide, organometallic compound those in the powdery form may be included in the additional powder. Such additional powders are generally contained in the paste for green sheet at a small amount of around 3 to 6 parts by weight with respect to 100 parts by weight of main component powder. Note that as an additional powder, a powder obtained by previously mixing an additional component by ball mill, dried, preliminary fired at 800 to 1000° C., and coarsely pulverized can be used.

According to the present embodiment, the high pressure dispersing treatment is applied to the pigment together with solvent and a part of lacquer (a binder resin solution). Said solvent is not particularly limited, but glycols, alcohol, ketones, esters and/or aromatic solvent are exemplified.

Ethyl carbitol, butanediol, 2-butoxyethanol, etc. are exemplified as glycols. Methanol, ethanol, propanol, butanol, etc. are exemplified as alcohol. Acetone, methyl ethyl ketone (MEK), diacetone alcohol, etc. are exemplified as ketones. Further, methyl acetate, ethyl acetate, etc. are exemplified as esters.

Toluene, xylene, benzyl acetate, etc. are exemplified as aromatic solvent.

Lacquer (resin solution) is a resin dissolved in an organic solution. Said resin is not particularly limited, but acrylic resin, polyvinyl butyral resin, polyvinyl acetal resin, ethyl cellulose resin may be used, however, polyvinyl butyral resin and polyvinyl acetal resin are used in the present embodiment in order to make the layer of the sheet thinner. Degree of polymerization of polyvinyl butyral resin and polyvinyl acetal resin is 1000 or more and 2600 or less, preferably 1400 or more and 2600 or less. Further, butyralization degree in the resin is more than 64% and less than 78%, preferably more than 64% and less than 70%, and an amount of residual acetyl group is less than 6%, preferably 3% or less.

Degree of polymerization of polyvinyl butyral resin or polyvinyl acetal resin can be measured by such as that of polyvinyl alcohol resin which is a raw material of those. Further, butyralization degree in the resin can be measured based on JISK6728. Furthermore, an amount of residual acetyl group can be measured based on JISK6728.

When degree of polymerization of polyvinyl butyral resin is too small, there is an inclination that the layers, which is preferably made thinner to 5 μm or less, more preferably 3 μm or less, may not provide a sufficient mechanical strength. While too large, it is in the inclination for the surface roughness to deteriorate when it is formed to a sheet. Further, when butyralization degree in polyvinyl butyral resin is too small, solubility into the paste tends to deteriorate, while when too large, it is in the inclination for the sheet surface roughness to deteriorate. Furthermore, when an amount of residual acetyl group is too large, the sheet surface roughness tends to deteriorate.

Organic solvent used for the lacquer is not particularly limited, but alcohol, butyl carbitol, acetone, toluene, etc. can be used. In the present embodiment, the organic solvent preferably comprises an alcohol solvent and an aromatic solvent, wherein said aromatic solvent is 10 parts by weight or more to 20 parts by weight or less when a total amount of the alcohol solvent and the aromatic solvent is 100 parts by weight. When an amount of the aromatic solvent is too small, the sheet surface roughness tends to deteriorate, while too large, filtration characteristic of the paste tends to deteriorate, and sheet surface roughness tends to increase causing deterioration of the sheet.

Methanol, ethanol, propanol, butanol, etc. are exemplified as alcohol solvent. Toluene, xylene and benzyl acetate, etc. are exemplified as aromatic solvent.

Binder resin is dissolved and filtered in a alcohol solvent selected at least one from methanol, ethanol, propanol or butanol, to make a solution, then, main component powder and the other components are preferably added to the solution. Binder resin having a high degree of polymerization is difficult to be dissolved in the solvent, and with a general method, dispersion of their paste tends to deteriorate. According to a method of an embodiment of the present invention, binder resin having a high degree of polymerization is first dissolved in the above-mentioned good solution, and then main component powder and the other components are dissolved in the obtained solution. Accordingly, with the method, paste dispersion can be improved and generation of non-dissolved resin can be suppressed. In addition, the solvents other than the above-mentioned solvents are unable to raise concentration of a solid content, and a change of lacquer viscosity tends to increase as time passes.

In the present embodiment, when a high pressure dispersing treatment is applied to pigment, solvent, and a part of lacquer (lacquer for preliminary addition) as preliminary slurry, a shearing stress is applied so that the shearing rate is set to $1 \times 10^7$ to $1 \times 10^8$ [1/sec], preferably, $2 \times 10^7$ to $1 \times 10^8$ [1/sec], more preferably, $3 \times 10^7$ to $1 \times 10^8$ [1/sec]. When said shearing rate at the high pressure dispersing treatment is too low, dispersion tends to decrease. The high pressure dispersing treatment may be done by pouring the preliminary slurry into a nozzle having a small diameter. Further, dispersants and/or plasticizers may be added to the preliminary slurry when applying the high pressure dispersing treatment.

The high pressure dispersing treatment is not applied to a remaining lacquer (lacquer for post-addition), and added after the treatment is applied. Ratio of the lacquer for the preliminary addition and the lacquer for post-addition is, considering a total amount of binder resin included in the finally obtained green sheet paste as 100 wt %, binder resin included in the lacquer for preliminary additional is less than 20 wt %, preferably less than 10 wt %, and 1 wt % or more, preferably 4 wt % or more.

After high pressure dispersing treatment is applied, together with the lacquer for post-addition, additives selected from dispersants, plasticizers, antistatic agent, dielectric, glass frit, insulators, are kneaded depending on the situation. Said additives may be added after applying the high pressure dispersing treatment, but may be added before applying the same and said high pressure dispersing treatment may be applied to the additives together with the preliminary slurry.

Conditions of kneading after the high pressure dispersing treatment are not particularly limited, but may be mixed with ball mill.

Dispersants are not particularly limited, but dispersants of maleic acids, polyethylene glycols and/or allylether copolymers are exemplified. Dioctyl phthalate is preferably used as plasticizer, however, it is not particularly limited in the present invention and can be suitably selected according to the binder resin. Further, antistatic agent is not particularly limited, but preferably imidazoline-based antistatic agent.

A paste for green sheet (ceramic slurry) manufactured by the flow chart shown in FIG. 2(A) is formed to a sheet state with die coater method to be a green sheet. These green sheets become dielectric layers 10 as shown in FIG. 1, and are alternately laminated with electrode films, which become internal electrode layers 12, then, cut to be a multilayer chip, and subjected to binder removal processing and firing, to be a capacitor element body 4.

Note that electrode film can be formed with a thick-film forming method such as printing method using electrode paste, or with a combination of thin-film forming method such as deposit or spattering and a method of transferring.

Note that binder removal processing may be applied under a general condition, however, when using base metals such as Ni or Ni alloys for conductive materials of internal electrodes, the following conditions may be particularly preferable.

heating rate: 5 to 300° C./hour
retaining temperature: 200 to 400° C.
retaining time: 0.5 to 20 hours
gas for ambient atmosphere: wet mixed gas of $N_2$ and $H_2$ Firing conditions are preferably the following condition.

heating rate: 50 to 500° C./hour
retaining temperature: 1100 to 1300° C.
retaining time: 0.5 to 8 hours
cooling rate: 50 to 500° C./hour
gas for ambient atmosphere: wet mixed gas of $N_2$ and $H_2$ The oxygen partial pressure in the firing atmosphere is preferably $10^{-2}$ Pa or less, more preferably $10^{-2}$ to $10^{-8}$ Pa. When the oxygen partial pressure exceeds the above range, the internal electrode layer tends to be oxidized, while when excessively lower than the above range, electrode materials in the internal electrode layer is abnormally sintered to be broken in some cases.

Heat treatment after such firing is done by keeping the retaining temperature or the highest temperature preferably at least 1000° C., more preferably 1000 to 1100° C. When retention temperature or the highest temperature during the heat treatment is less than the above-mentioned range, oxidation of dielectric materials will be insufficient, and insulation resistance lifetime tends to be shortened, while when more than the above-mentioned range, Ni of inner electrode is not only oxidized, and the capacitance tends to decrease but react with the dielectric base and lifetime tends to decrease. Oxygen partial pressure when heating is higher than that of reducing atmosphere when firing, and preferably $10^{-3}$ Pa to 1 Pa, more preferably $10^{-2}$ Pa to 1 Pa. When said oxygen partial pressure when heating is less than the above-mentioned range, it is difficult to reoxidize the dielectric layer 2, while more than the above-mentioned range, internal electrode layer 3 tends to oxidize. The other heat treatment conditions are preferably the following.

Retaining time: 0 to 6 hours
cooling rate: 50 to 500° C./hour
gas for ambient atmosphere: wet $N_2$ gas or so A wetter, etc. may be used to wet the $N_2$ gas and mixed gas, etc. In this case, the water temperature is preferably 0 to 75° C. or so. The binder removal processing, firing and heat treatment may be performed continuously or separately. When performing continuously, it is preferable that the atmosphere is changed without cooling after the binder removal processing, the temperature is raised to the retaining temperature of firing to perform firing, then, cooled to the retaining temperature of heat treatment and the heat treatment is performed by changing the atmosphere. On the other hand, when performing separately, at the time of firing, it is preferable that the temperature is raised to the retaining temperature of the binder removal processing in an atmosphere of a $N_2$ gas or a wet $N_2$ gas, the atmosphere is changed, and the temperature is furthermore raised. And after cooling the temperature to the holding temperature of the heat treatment, it is preferable that the cooling continues by changing the atmosphere again to a $N_2$ gas or a wet $N_2$ gas. Also, in the heat treatment, after raising the temperature to the holding temperature under the $N_2$ gas atmosphere, the atmosphere may be changed, or the entire process of the heat treatment may be in a wet $N_2$ gas atmosphere.

End surface polishing, for example, by barrel polishing or sand blast, etc. is performed on the sintered body (element body 4) obtained as above, and the external electrode paste is baked to form external electrodes 6, 8. A firing condition of the external electrode paste is preferably, for example, at 600 to 800° C. in a wet mixed gas of $N_2$ and $H_2$ for 10 minutes to 1 hour or so. A cover layer is formed by plating, etc. on the surface of the external electrodes 6, 8 if necessary. Note external electrode paste can be prepared in the same way as the above-mentioned electrode paste.

A multilayer ceramic capacitor of the present invention produced as above is mounted on a print substrate, etc. by soldering, etc. and used for a variety of electronic apparatuses, etc.

In the present embodiment, as shown in FIG. 2(A), shearing stress is applied to aggregated powders in slurry by applying a high-pressure dispersing treatment to the preliminary slurry. With this method, the aggregated powders are disaggregated and pigments (ceramic powder) are dispersed to one particle per each unit. Since this stress is applied only using the slurry and does not require media such as bead, contamination does not occur.

Moreover, when a resin is mixed in the slurry, the shearing stress by a pressure is also applied to the resin, causing the destruction of the resin and a decrease of a molecular weight. This will deteriorate strength of the obtained sheet, and also detachability and conveyance of the sheet. To the contrary, the binder resin as in the embodiment is poured in the paste after the high pressure treatment is applied, and the shearing stress is not applied to the binder resin, therefore, deterioration of the sheet strength is prevented.

Furthermore, temperature of the paste generally rises when high pressure dispersing treatment is applied. Therefore, if said high pressure dispersing treatment is excessively applied to a paste containing an organic solvent, risk such as explosion, will arise. To the contrary, since there is only a small amount of resin and lacquer dissolving the resin in the treating slurry of the present embodiment, there is an advantage that the pigment ratio as in the treating slurry becomes high, a specific heat of said slurry becomes high, and a temperature rise is suppressed. Therefore, treating the slurry as in the present invention is more secure compared to treating slurry containing whole lacquer. Further, higher pressure treatment can be applied to said slurry of the invention compared to the slurry containing whole lacquer, and a smoother sheet can be obtained by the slurry of the invention.

In this way, a green sheet having a smooth front surface, a good dispersion of pigments, wherein strength of the sheet does not deteriorate can be obtained. Further, surface roughness of the sheet becomes very small with respect to the thickness between layers, therefore, said thickness between layers can be made small and the layers can be made thinner. With the invention, more numbers of layers can be laminated as in multilayer ceramic devices such as a multilayer ceramic capacitor, and said devices can be more small-sized.

Note that the present invention is not limited to the embodiment described above and can be varied within the scope of the invention.

For instance, ceramic slurry according to the present invention is not limited to the paste for green sheet as described in the embodiment mentioned above, but can suitable used as the other ceramic slurries, such as electrode past or blank paste.

Further, the multilayer ceramic device manufactured by using the ceramic slurry according to the invention is not limited to multilyaer ceramic capacitor, but inductor, varistor, etc. are exemplified.

EXAMPLES

Next, the present invention will be explained further in detail by taking more specific examples of the embodiment of the present invention, but the present invention is not limited to the examples.

Example 1

Manufacturing Method of a Paste for a Green Sheet (Ceramic Slurry)

$BaTiO_3$ powder (BT-02/ Sakai Chemical Industry Co., Ltd.) is used for a starting material of a ceramic powder. With respect to 100 parts by weight of $BaTiO_3$ powder, 1.48 parts by weight of $(Ba_{0.6}Ca_{0.4})SiO_3$, 1.01 parts by weight of $Y_2O_3$, 0.72 wt % of $MgCO_3$, 0.13 wt % of $Cr_2O_3$, and 0.045 wt % of $V_2O_5$ are prepared for subcomponent additives of the ceramic powder.

First, only the subcomponent additives were mixed by ball mill to make slurry. Namely, the subcomponent additives (total amount of 8.8 g), 15 grams of solvent having a ratio of ethanol:propanol:xylene=42.5:42.5:15, and dispersants (0.1 g) were preliminary pulverized for 20 hours to obtain the subcomponent additives of pulverized slurry.

Next, with respect to $BaTiO_3$:191.2 g, 24 g of the subcomponent additives of pulverized slurry, 123 g of ethanol, 123 g of n-propanol, 56 g of xylene, 136 g of diethylene glycol monoethyl ether (DGME), 15 g of mineral spirit, 1.4 g of dispersants, 6 g of DOP (dioctyl phthalate), 0.8 g of antistatic agent of imidazolines, and 3.3 g of lacquer of polyvinyl butyral resin (lacquer for preliminary addition) are applied with a high-pressure dispersing treatment to obtain preliminary slurry.

The high-pressure dispersing treatment is done by using the high-pressure dispersing device (ultimaizer HJP-25005 of Sugino Machine Co.) under a condition of 100 MPa. Shearing rate applied to the slurry during the high-pressure dispersing treatment was calculated from the diameter of a nozzle of the treatment device and treated rate of the slurry and it was $5.10 \times 10^7$ [1/sec] as shown Table 2. The temperature of the slurry after applying the high-pressure dispersing treatment was 42° C. as shown in Table 2.

Then, 78.8 g of the same lacquer mentioned above (lacquer for post-addition) except the high-pressure dispersing treatment was not applied, was added to the preliminary slurry after the high-pressure dispersing treatment was applied, and kneaded to obtain ceramic slurry (a paste for green sheet). Kneading condition was 16 hours of ball mill mixing.

For lacquer, 15% lacquer (BH6 of Sekisui Chemical Co. was dissolved in ethanol/n-propanol=1:1) of BH6 of Sekisui Chemical Co. (Polybutyral resin/PVB) was used. Degree of polymerization as in polybutyral resin used as binder resin was 1400, the butyralization degree was 69±3% and residual acetyl groups were 3±2%. Further, as dispersants, nonion dispersants of polyethylene glycol groups (HLB=5 to 6) were used.

When the total wt % of binder resin included in finally obtained paste for green sheet was 100 wt %, the additional amount of binder resin included in lacquer for preliminary addition was 4.2 wt %. The viscosity of finally obtained paste for green sheet was 20 cP. Note that the viscosity of the paste was measured by using B type viscometer and S21 as rotor at 25° C. immediately after a drop of the paste came out from the mill. Measuring revolution was 50 rpm.

Manufacturing Method of Green Sheet

Paste obtained by the above-mentioned method is applied on the PET film used as support film by using wire bar coater and dried to obtain green sheet having a thickness of 1 μm. Rate of applying the paste was 50 m/min., temperature of furnace for drying was 60 to 70° C., and drying time was 2 minutes.

Stability when applying the paste was examined. The results are shown in Table 1. The stability was examined as following. When viscosity of the paste is 10 cP or less, it becomes difficult to provide a thin layered sheet having a constant thickness, therefore, when said viscosity was more than 10 cP, it was considered good, and the rest was considered bad.

Evaluation of Green Sheet

Next, glossiness of the green sheet was measured. The glossiness was measured based upon JIS Z-8741 (1983) method 3 by using VGS-LD of Japan Densyoku Industries Co., Ltd. The results are shown in Table 1. When measuring the glossiness, it was considered to be good when 70% or more, and the rest was considered to be bad. When the glossiness is less than 70%, characteristic of the sheet surface becomes inferior and when made to a chip, it causes short-circuit.

Sheet strength of the green sheet was also measured. 5 sheets punched to be dumbbell shaped forms were prepared as samples, and each sample was stretched by a tensile rate of 8 mm/min using a tensile test device of Instron 5543 and strength of each tension fracture was measured, then, an average value of those was calculated to obtain the sheet strength. The results are shown in Table 1. When the sheet strength is less than 4.5 MPa, it will be difficult to release thin-layered sheet having a thickness of around 1 μm, and it will provide a great disadvantage to the manufacturing method. Therefore, as in table 1, when the sheet strength is 4.5 MPa or more, it is considered to be good and the rest to be bad.

TABLE 1

| | an amount of resin when applying a high pressure dispersing treatment [PHP] | a ratio of resin included in lacquer for preliminary addition to a whole amount of resin [wt %] | viscosity of paste [cP] | stability when applying paste | sheet glossiness [%] | glossiness determination | 1 μm sheet strength [MPa] | 1 μm sheet release | Comprehensive Evaluation |
|---|---|---|---|---|---|---|---|---|---|
| Ref. Ex. 1 | not applied | not applied | 21 | ○ | 53 | x | 6.2 | ○ | x |
| Ex. 1 | 0.25 | 4.2 | 20 | ○ | 73 | ○ | 6.2 | ○ | ○ |
| Ex. 2 | 0.5 | 8.3 | 19 | ○ | 73 | ○ | 6.1 | ○ | ○ |
| Ex. 3 | 1 | 16.7 | 18 | ○ | 74 | ○ | 5.9 | ○ | ○ |
| Ref. Ex. 2 | 6 | 100.0 | 9 | x | 76 | ○ | 4.1 | x | x |

○: good
x: bad

TABLE 2

| | an amount of resin when applying a high pressure dispersing treatment [PHP] | a ratio of resin included in lacquer for preliminary addition to a whole amount of resin [wt %] | sheering rate [1/s] | temperature of paste [° C.] | glossiness [%] | 1 μm sheet strength [MPa] | 1 μm sheet release | Comprehensive Evaluation |
|---|---|---|---|---|---|---|---|---|
| Ex. 1 | 0.25 | 4.2 | 5.10E=07 | 42 | 73 | 6.2 | ○ | ○ |
| Ex. 1-2 | 0.25 | 4.2 | 8.20E+07 | 63 | 79 | 6.1 | ○ | ○ |
| Ref. Ex. 2 | 6 | 100 | 4.50E+07 | 49 | 76 | 4.1 | x | x |
| Ref. Ex. 2-2 | 6 | 100 | 7.20E+07 | 70 | — | — | — | x |

Example 2

Green sheet was manufactured in the same way as in Example 1 except an amount of binder resin included in lacquer for preliminary addition was 8.3 wt %, with respect to 100 wt %, of a total amount of binder resin included in the finally obtained paste for green sheet, and evaluated in the same way as in Example 1. The results are shown in Table 1.

Example 3

Green sheet was manufactured in the same way as in Example 1 except binder resin included in lacquer for preliminary addition was 16.7 wt %, with respect to 100 wt %, of a total amount of binder resin included in the finally obtained paste for green sheet. The manufactured green sheet was evaluated in the same way as in Example 1. The results are shown in Table 1.

Reference Example 1

Green sheet was manufactured in the same way as in Example 1 except lacquer for post-addition was not added, a high-pressure dispersing treatment was not applied, and all the components were mixed for 16 hours by a ball mill. The manufactured green sheet was evaluated in the same way as in Example 1. The results are shown in Table 1 and 2.

Reference Example 2

Green sheet was manufactured in the same way as in Example 1 except binder resin included in lacquer for preliminary addition was 100 wt % (lacquer for post-addition was not added), with respect to 100 wt %, of a total amount of binder resin included in the finally obtained paste for green sheet. The manufactured green sheet was evaluated in the same way as in Example 1. The results are shown in Table 1.

Example 1-2

Green sheet was manufactured in the same way as in Example 1 except the high-pressure dispersing treatment was applied under the pressure of 160 MPa and shearing rate of $8.20 \times 10^7$ [1/sec]. The manufactured green sheet was evaluated in the same way as in Example 1. The results are shown in Table 2. Temperature of the paste was 63° C.

Reference Example 2-2

Green sheet was manufactured in the same way as in Example 1 except the high-pressure dispersing treatment was applied under the pressure of 160 MPa and shearing rate of $7.20 \times 10^7$ [1/sec]. The manufactured green sheet was evaluated in the same way as in Example 1. The results are shown in Table 2. Here, temperature of the paste became 70° C., which is nearly a boiling point of organic solvent component in the paste and it was necessary to take measures to prevent exploding and was not able to manufacture sheet under usual condition.

Comprehensive Evaluation

Comprehensive evaluation as in Tables 1 and 2 was considered to be bad when any one of paste stability, glossiness, and sheet release was considered to be bad, and the rest was considered to be good.

From the results shown in Table 1, the comprehensive evaluation was confirmed to improve when an amount of binder resin included in lacquer for preliminary addition was 1 wt % or more and less than 20 wt %, with respect to whole binder resin included in the finally obtained paste for green sheet.

What is claimed is:

1. A manufacturing method of ceramic slurry at least comprising a ceramic powder and a binder resin solution,
    wherein a high-pressure dispersing treatment of the ceramic powder and a lacquer for preliminary addition, which is a part of the binder resin solution, is carried out so that a shearing rate is set to $1 \times 10^7$ to $1 \times 10^8$ [1/sec] to prepare a preliminary slurry,
    at least a lacquer for post-addition, which a high-pressure dispersing treatment is not applied, is added to the preliminary slurry which a high-pressure dispersing treatment is applied, and
    an amount of the binder resin contained in the lacquer for preliminary addition is less than 10 wt% and 1 wt% or more with respect to the whole amount of resin contained in the finally obtained ceramic slurry.

2. The manufacturing method of ceramic slurry as set forth in claim 1, wherein, when applying the high pressure dispersing treatment, shearing stress is applied to the preliminary slurry so that the shearing rate is set to $2 \times 10^7$ to $1 \times 10^8$ [1/sec].

3. The manufacturing method of ceramic slurry as set forth in claim 1, wherein a binder resin of the binder resin solution is polyvinyl butyral resin or polyvinyl acetal resin.

4. The manufacturing method of ceramic slurry as set forth in claim 3, wherein degree of polymerization of the binder resin is at least 1000 and at most 2600.

5. The manufacturing method of ceramic slurry as set forth in claim 1, wherein the high pressure dispersing treatment is applied by pouring the preliminary slurry from a wide path to a narrow path under a high pressure.

6. The manufacturing method of ceramic slurry as set forth in claim 1, wherein a particle size of the ceramic powder is 0.01 μm to 0.5 μm.

7. The manufacturing method of ceramic slurry as set forth in claim 1, wherein at least a part of dispersants and/or plasticizers is added to the preliminary slurry before applying the high pressure dispersing treatment.

8. The manufacturing method of ceramic slurry as set forth in claim 1, wherein at least a part of dispersants and/or plasticizers is added to the preliminary slurry after applying the high pressure dispersing treatment.

9. A green sheet manufactured by using the ceramic slurry obtained by the manufacturing method of ceramic slurry as set forth in claim 1.

10. A multilayer ceramic device manufactured by the steps of:
   stacking the green sheet as set forth in claim 9 to obtain a green chip, and
   firing the green chip.

11. A multilayer ceramic capacitor manufactured by the steps of:
   stacking the green sheet as set forth in claim 9 to obtain a green chip, and
   firing the green chip.

12. A green sheet manufactured by using the ceramic slurry obtained by the manufacturing method of ceramic slurry as set forth in claim 2.

13. A green sheet manufactured by using the ceramic slurry obtained by the manufacturing method of ceramic slurry as set forth in claim 3.

14. A green sheet manufactured by using the ceramic slurry obtained by the manufacturing method of ceramic slurry as set forth in claim 4.

15. A green sheet manufactured by using the ceramic slurry obtained by the manufacturing method of ceramic slurry as set forth in claim 5.

16. A green sheet manufactured by using the ceramic slurry obtained by the manufacturing method of ceramic slurry as set forth in claim 6.

17. A green sheet manufactured by using the ceramic slurry obtained by the manufacturing method of ceramic slurry as set forth in claim 7.

18. A green sheet manufactured by using the ceramic slurry obtained by the manufacturing method of ceramic slurry as set forth in claim 8.

\* \* \* \* \*